US007307036B2

(12) United States Patent
Xu et al.

(10) Patent No.: US 7,307,036 B2
(45) Date of Patent: Dec. 11, 2007

(54) HIGHLY ACTIVE ALPHA-OLEFIN POLYMERIZATION CATALYST

(75) Inventors: Guangxue Xu, Port Lavaca, TX (US); Honglan Lu, Port Lavaca, TX (US); Zhongyang Liu, Port Lavaca, TX (US); Chih-Jian Chen, Port Lavaca, TX (US)

(73) Assignee: Formosa Plastics Corporation U.S.A., Livingston, NJ (US)

( * ) Notice: Subject to any disclaimer, the term of this patent is extended or adjusted under 35 U.S.C. 154(b) by 578 days.

(21) Appl. No.: 10/896,723

(22) Filed: Jul. 22, 2004

(65) Prior Publication Data

US 2006/0019821 A1 Jan. 26, 2006

(51) Int. Cl.
*B01J 31/38* (2006.01)

(52) U.S. Cl. ....................... 502/116; 502/115; 502/118; 502/133; 502/158; 526/348; 526/128; 526/125.1; 526/123.1; 526/124.2

(58) Field of Classification Search ................ 526/348, 526/128, 125.1, 123.1, 124.2; 502/103, 115, 502/116, 118, 133, 158
See application file for complete search history.

(56) References Cited

U.S. PATENT DOCUMENTS 3,113,115 A 12/1963 Ziegler et al. .............. 252/429
3,787,384 A 1/1974 Stevens et al. ............ 260/94.9
3,907,759 A * 9/1975 Okada et al. ............... 526/128
4,076,698 A 2/1978 Anderson et al. ........... 526/348
4,148,754 A 4/1979 Strobel et al. .............. 252/429
4,223,118 A * 9/1980 Tsubaki et al. ............. 526/128
4,335,016 A 6/1982 Dombro ..................... 252/429
5,258,345 A 11/1993 Kissin et al. ............... 502/116
5,336,652 A 8/1994 Mink et al. ................. 502/125
5,470,812 A 11/1995 Mink et al. ................. 502/125
5,561,091 A * 10/1996 Mink et al. ................. 502/115

FOREIGN PATENT DOCUMENTS

EP 0 529 977 A1 8/1992
FR 2116698 7/1972

* cited by examiner

*Primary Examiner*—Ling-Sui Choi
(74) *Attorney, Agent, or Firm*—Howrey LLP

(57) ABSTRACT

A highly active alpha-olefin polymerization catalyst component is disclosed. In the presence of a co-catalyst, the catalyst component is useful for the production of LLDPE resins. The catalyst component is produced by a method whereby organic silicon compounds are reacted with a transition metal complex and active transition metal species is deposited on a silicon-containing $MgCl_2$ that is prepared in situ in the presence of the organic silicon compounds.

13 Claims, No Drawings

HIGHLY ACTIVE ALPHA-OLEFIN POLYMERIZATION CATALYST

FIELD OF THE INVENTION

The invention relates to the field of polymer chemistry and, more specifically, to a catalyst system useful for co-polymerizing ethylene with α-olefins. In particular, a catalyst component incorporating organic silicon compounds is disclosed. The catalyst system of the present invention is useful for producing linear low density copolymers of ethylene (LLDPE).

BACKGROUND OF THE INVENTION

Linear low-density polyethylene (LLDPE) possesses properties that distinguish it from other polyethylene polymers. Examples of such properties are described in U.S. Pat. No. 4,076,698 by Anderson et al. The use of LLDPE is growing rapidly in markets such as blown and cast films, injection molding, rotational molding, blow molding, pipe, tubing, and wire and cable applications. The principal use for LLDPE copolymers is in film forming applications because the copolymers typically exhibit high dart impact, high Elmendorf tear, high tensile strength and high elongation, in both the machine direction (MD) and the transverse direction (TD).

Ziegler-Natta type catalyst systems for the producing polyethylene and LLDPE are well known in the art and have been known at least since the issuance of U.S. Pat. No. 3,113,115, by Karl Ziegler et al. U.S. Pat. No. 3,787,384, by Steven et al., and U.S. Pat. No. 4,148,754, by Strobel et al., describes a catalyst prepared by reacting a support (e.g., silica containing reactive hydroxy groups) with an organomagnesium compound (e.g., a Grignard reagent) and then combining this reacted support with titanium compounds. French Patent No. 2,116698, by Durand et al., describes a catalyst prepared by a method comprising a reaction between magnesium metal, at least one halogenated hydrocarbon, and at least one tetravalent titanium compound. European Patent EP 0,529,977, by Eric Daire, describes using such a catalyst composition in a gaseous phase process to produce LLDPE. The catalyst composition of Durand et al. and the corresponding gaseous phase polymerization process of Daire do not produce LLDPE with a density of less than 0.918 at high catalyst productivity rates because of poor fluidization caused by resin stickiness, chunk formation, and reactor fouling. It would be advantageous and desirable to devise a catalyst system to produce LLDPE resins of lower density with reduced resin stickiness, chunk formation and reactor fouling in the fluid bed gas-phase process, especially at high production rates.

Recently, additional efforts to improve the polymer physical and chemical properties so as to be useful in a wide variety of superior products and applications have focused on (1) increasing catalyst productivity to reduce LLDPE cost; (2) narrowing molecular weight distributions of the resins produced with the catalysts; (3) increasing the capability of the catalysts to effectively co-polymerize ethylene and alpha-olefins; (4) reducing content of lower molecular weight component; and (5) improving the response of the resin molecular weight to hydrogen.

Specifically, copolymers of ethylene with α-olefin (e.g., LLDPE) having narrower molecular weight distribution are desired for films and injection-molded products. Resins having a relatively narrow molecular weight distribution produce inject-molded products exhibiting a minimum amount of warping or shrinkage. Additionally, LLDPE resins having relatively low molecular weight distribution produce films having better strength properties than resins with broad molecular weight distribution.

Catalysts with the ability to effectively co-polymerize ethylene with higher alpha-olefins such as $C_3$-$C_{10}$ alpha-olefins to produce polymers having low densities are desired. Enhancing the incorporation of co-monomer into the polyethylene chain reduces polymer density, giving the LLDPE advantageous properties. LLDPE with lower density is used to produce polyethylene film that is substantially more resistant to tearing and puncturing, has higher dart impact, and better cling properties than a film made from similar resins of higher densities.

It is also desirable to provide a catalyst composition with good hydrogen response, capable of producing ethylene copolymer products in the gas phase polymerization.

SUMMARY OF THE INVENTION

An aspect of the present invention provides a high activity catalyst composition for polymerizing alpha-olefins that yields linear low-density polyethylene (LLDPE). The catalysts prepared according to the invention are particularly useful for the production of LLDPE resins. Such LLDPE resins may have a density of 0.94 g/cc or less, preferably 0.930 or less or even 0.910 g/cc or less. In accordance with certain aspects of the present invention, it is possible to achieve densities of less than 0.910 g/cc and even 0.880 g/cc. The produced LLDPE also has a relatively narrow molecular weight distribution and a relative low content of low molecular weight polymeric component. A still further aspect of the present invention provides a catalyst having good hydrogen response and that effectively produces the target products in the gas phase polymerization process.

One embodiment of the present invention is a supported alpha-olefin polymerization catalyst component prepared by:

(i) contacting a halogen-substituted silane with one or more compounds selected from the group of compounds consisting of alkoxysilanes, silanols, and hydropolysiloxanes;
  wherein the halogen-substituted silane has formula (I) $R^1xSiXy$ where $R^1$ is $C_1$-$C_{20}$ hydrocarbyl, X is halogen, x=0-3, and y=1-4;
  the alkoxysilane has formula (II) $R^2{}_mSi(OR^3)_n$ where $R^2$ and $R^3$ are $C_1$-$C_{20}$ hydrocarbyl, m=0-3, and n=1-4; and
  the silanol has formula (III) $R^4{}_wSi(OH)_{4-w}$, wherein $R^4$ is $C_1$-$C_{18}$ hydrocarbon and w is 1, 2 or 3; and
  the hydropolysiloxane has repeat units of the formula (V) $R^6{}_pH_qSiO_{((4-p-q)/2)}$, where $R^6$ is alkyl, aryl, aralkyl, alkoxy or aryloxy; p is 0, 1 or 2; q is 1, 2 or 3; and $p+q \leqq 3$.

(ii) treating the mixture of step (i) with a transition metal compound having the formula $M(OR^5)_aX_{4-a}$ (IV);
  where M is a transition metal, $R^5$ is $C_1$-$C_{20}$ hydrocarbon, X is halogen, and $0<a \leqq 4$; and (iii) contacting the mixture of step (ii) with a silicon-containing composite magnesium chloride support prepared by reacting metallic magnesium with an alkyl halide or aromatic halide with a compound selected from the group consisting of silanols of formula (III) and hydropolysiloxanes having repeat units of formula (V).

The transition metal in the compound of formula IV is typically titanium or vanadium.

Contacting the catalyst component of the present invention with an alkylaluminum co-catalyst renders it particularly effective for the production of LLDPE. The resulting activated catalyst composition has substantially higher productivity in polymerizing alpha-olefins, substantially improved higher comonomer (i.e., $C_3$-$C_{10}$ alpha-olefin) incorporation properties. The present invention produces LLDPE with the density as low as 0.900 without resin stickiness and reactor fouling, compared to similar catalyst compositions prepared without the silane compounds and silicon-containing magnesium chloride composite support. The catalyst also has excellent hydrogen response and produces polymers having a relatively narrow molecular weight distributions and a relatively lower content of low molecular weight component.

DETAILED DESCRIPTION OF THE INVENTION

One aspect of the present invention is a highly active catalyst composition for polymerizing alpha-olefins comprising a component prepared by (1) contacting a halogen-substituted silane (I) with one or more compounds selected from the group consisting of alkoxysilanes (II), silanols (III), and hydropolysiloxanes having repeat units of formula (V), to form an organic silicon intermediate, (2) treating the organic silicon intermediate with a transition metal compound having the structural formula of $M(OR)_aX_{4-a}$ (IV) wherein M is a transition metal; $R^5$ is a hydrocarbon group having 1 to 20 carbon atoms, X is halogen, and $0<a\leqq 4$, to form a transition metal-containing intermediate, (3) contacting the transition metal-containing intermediate of step (2) with a silicon-containing magnesium chloride support prepared by reacting metallic magnesium with an alkyl or aromatic halide and hydropolysiloxane (V), and (4) contacting the product of step (3) with a trialkylaluminum as a cocatalyst. The transition metal support of step (3) is typically prepared in situ with the reactions of steps (1) and (2), thereby producing a catalyst component that is different in structure and morphology that other catalyst components in the art.

The catalyst component of the present invention is prepared using several organic silicon compounds; a halogen-substituted silane (I), an alkoxysilane (II), and/or a silanol (III) and a hydropolysiloxane (V). Examples of preferred species of organic silicon compounds are those defined by $R_{1x}SiX_y$ (I), $R^2_mSi(OR^3)_n$(II), $R^4_wSi(OH)_{4-w}$ (III), and $R_{6p}H_qSiO_{((4-p-q)/2)}$ (V), where $R^1$ represents $C_1$-$C_{20}$ hydrocarbyl, x=0-3, y=1-4, X is halogen, $R^2$ and $R^3$ represent $C_1$-$C_{20}$ hydrocarbyl, m=0-3, n=1-4; $R^4$ represents a $C_1$-$C_{18}$ hydrocarbon moiety and w is 1, 2 or 3, $R^6$ represents an alkyl, aryl, aralkyl, alkoxy or aryloxy group, p is 0, 1 or 2; q is 1, 2 or 3; and $p+q\leqq 3$.

Organic silicon compounds have been used in the art to make LLDPE catalysts. U.S. Pat. Nos. 5,336,652, 5,470,812, and 5,561,091, by Mink, U.S. Pat. No. 5,258,345 by Kissin, and U.S. Pat. No. 4,335,016, by Dambor describe using an alkoxysilane having the formula of $R^2_mSi(OR^3)_n$ (II) and/or $SiCl_4$ to modify silica-supported LLDPE catalysts for the polymerization of alpha-olefins having a relatively narrow molecular weight distribution. In U.S. Pat. No. 5,336,652 and U.S. Pat. No. 5,470,812, alkoxysilane (II) having the structural formula of $R^2_mSi(OR^3)_n$ was used in a silica supported catalyst system to narrow the molecular weight distribution of LLDPE products. In U.S. Pat. No. 5,561,091, ROH/$SiCl_4$ was used to improve a silica supported LLDPE catalyst for narrowing the molecular weight distribution. U.S. Pat. No. 5,258,345 describes using an alkoxysilane having the structural formula of $R^2_mSi(OR^3)_n$, together with $SiCl_4$, to improve a silica supported catalyst, which produced LLDPE with a bimodal molecular weight distribution containing a high molecular weight fraction. U.S. Pat. No. 4,335,016, by Dambro, describes a silica supported olefin polymerization catalyst using an alkoxysilane having the structural formula $R^2_mSi(OR^3)_n$.

However, neither the alkoxysilane (e.g., $R^2_mSi(OR^3)_n$) alone nor in combination with $SiCl_4$ provide a polymerization catalyst which exhibits high catalyst activity and productivity and that is capable of providing ethylene copolymers having all of the desired characteristics listed in the introduction. For examples, the Mink, Kissin, and Dombro catalysts show lower $H_2$ response, lower catalyst reactivity or productivity, and lower polymer bulk density, compared to catalyst compositions prepared without the alkoxysilane or without alkoxysilane and $SiCl_4$. U.S. Pat. No. 6,171,993 B1, by Mavridis, confirmed that the Mink, Kissin, and Dombro catalysts are incapable of producing the target LLDPE products via gas phase polymerization because those catalysts show poor catalyst productivity, poor density/hexene response (low comonomer incorporation), and poor $H_2$ response.

U.S. Pat. No. 3,907,759, by Okada et al. describes a process for producing granular ethylene polymers having large, uniform particle sizes using a catalyst component obtained by reacting a transition metal halogen compound with a reaction product between a Grignard reagent and an organic silicon compound selected from the group consisting of chain or cyclic hydropolysiloxanes having structural units expressed by the formula $R^4_wSi(OH)_{4-w}$ or $R^6_pH_qSiO_{((4-p-q)/2)}$. The catalyst described in the prior art was prepared in multiple steps, in which a catalyst support was first prepared and isolated from a reaction between a Grignard reagent in tetrahydrofuran solution and a hydropolysiloxane compound, and then the catalyst component was obtained by reacting a transition metal halogen compound, i.e. titanium tetrachloride, with the isolated reaction product (support) between a Grignard reagent in tetrahydrofuran solution with a hydropolysiloxane compound. The catalyst was used for producing polyethylene homopolymer in a slurry polymerization process and the polymer produced has good powder bulk density and morphology. U.S. Pat. No. 4,223,118, by Tsubaki et al. describes a modified version of the catalyst system as described in the U.S. Pat. No. 3,907,759 by reacting a transition metal halogen compound, i.e. titanium tetrachloride, with the isolated reaction product (support) between a Grignard reagent in tetrahydrofuran solution with a hydropolysiloxane compound, in the presence of one or more aluminium alkoxide compound. The modified catalyst system produces polyethylene homopoloymers with significantly broader molecular weight distribution. However, The catalyst systems disclosed in both U.S. Pat. Nos. 3,907,759 and 4,223,118 are suitable only for producing polyethylene homopolymers in slurry polymerization process. The catalysts show poor comonomer response, and therefore are not practical for producing linear lower density polyethylene (LLDPE), particularly in a gas phase polymerization process.

Unlike the catalyst described above, the present invention utilizes an in-situ process whereby a transition metal is deposited on the support during the reaction that generates the support. In the prior art catalyst components, silicon-containing compounds were used to prepare or modify a $MgCl_2$ or silicon support, and then the transition metal was deposited on the support after the reducing power of the silicon-containing compounds had been used up. Contrarily, in the present invention, hydropolysiloxane and/or silanol is not only used to produce a support, but is also used as a reducing agent to produce more of the active metal species (e.g., $Ti^{3+}$) and as a morphology modifier to improve the surface formation of silicon-containing $MgCl_2$ support in the hydrocarbon solution. The result is a catalyst component that is chemically and morphologically different than the prior art catalyst components that used silicon compound simply to prepare or modify the $MgCl_2$ or silicon support. Consequently, the catalyst composition in the present invention shows high catalyst productivity and good comonomer/density response and hydrogen response, and the LLDPE resins produced with the inventive catalysts have relatively narrow molecular weight distribution and excellent powdery flow ability without any reactor fouling and chunk formation, even if the polymer density is less than 0.910 at high production rate in the gas phase polymerization, and therefore it is particularly advantageous for production of LLDPE resins.

According to one aspect of the present invention, the combination of silane compounds $R^1xSiCly$ (I), $R^2{}_mSi(OR^3)_n$ (II), $R^4{}_wSi(OH)_{4-w}$ (III), and $R^6{}_pH_qSiO_{((4-p-q)/2)}$ (V) produces catalyst composition having high catalyst productivity, relatively narrow molecular weight distribution, better $H_2$ response, and high co-monomer incorporation to produce LLDPE with very low density from 0.900 to 0.917 without resin stickiness, chunk formation and reactor fouling.

According to one embodiment of the invention, the proportions of the components of the catalyst composition satisfy the equations:

$$G=[Ti]/\{[Mg]+[\text{formula (I)}]+[\text{formula (II)}]+([\text{formula (III)}] \text{ or } [\text{formula (V)}])\}$$

and $$H=([III] \text{ or } [V])/([I]+[II])$$

to provide G and H values from about 0.05 to about 0.80 and from about 0.05 to about 0.90, respectively. A more preferable range is about 0.10 to about 0.30 for G and from about 0.15 to about 0.60 for H. According to some embodiments, when G is out of the range of about 0.10 to about 0.30 and H is out of the range of about 0.15 to about 0.60, the catalyst productivity, molecular weight distribution, $H_2$ response, and co-monomer incorporation of LLDPE declines. Also, target LLDPE products become difficult or impossible to produce by gas phase polymerization due to poor catalyst productivity, and poor density/hexene response and poor $H_2$ response.

Examples of specific halogen-substituted silane (I) compounds that can be used in the invention include, but are not limited to, silicon tetrachloride, tetrabromosilane, tetrafluorosilane, tetrachlorosilane, allyldichlorosilane, allyltrichlorosilane, benzyltrichlorosilane, bis(dichlorosilyl)methane, 2-bromoethyltrichlorosilane, t-butyldichloro-silane, t-butyltrichlorosilane, 2-(carbomethoxy)ethyltrichlorosilane, 2-chloroethylmethyl-dichlorosilane, 2-chloroethyltrichlorosilane, 1-chloroethyltrichlorosilane, chloroethylmethyldichlorosilane, ((chloromethyl)phenylethyl)trichlorosilane, chloroethyltrichlorosilane, 2-cyanoethylmethyldichlorosilane, cyclohexyl-trichlorosilane, cyclopentyltrichlorosilane, cyclotetramethylenedichlorosilane, cyclo-trimethylene-dichlorosilane, decylmethyldichlorosilane, dibenzyloxy-dichlorosilane, 1,5-dichlorohexamethyltrisiloxane, (dichloromethyl)trichlorosilane, dichlorosilane, 1,3-dichloro-tetramethyldisiloxane, diethoxydichlorosilane, ethylmethyl-dichlorosilane, ethyltrichlorosilane, heptyltrichlorosilane, hexachlorodisilane, hexachloro-disiloxane, isobutyltrichlorosilane, methyldichlorosilane, methyltrichlorosilane, octyltrichloro-silane, pentyltrichlorosilane, propyltrichlorosilane, and trichloromethyltrichlorosilane.

Examples of specific alkoxysilane (II) compounds that can be used in the invention include, but are not limited to, tetramethoxysilane, tetraethoxysilane, tetraisopropoxysilane, tetrapropoxysilane, tetrabutoxysilane, tetraisobutoxysilane, tetraphenoxysilane, tetra(p-methylphenoxy)silane, tetrabenzyloxysilane, tetrakis(2-methoxyethoxy)silane, tetrakis(2-ethylhexoxy)silane, tetraallyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyltrimethoxysilane, octadecyltrimethoxysilane, octadecyltriethoxysilane, octyltriethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropyloxysilane, dimethyl-dibutoxysilane, dimethyldihexyloxysilane, dimethyldiphenoxy-silane, diethyldiethoxysilane, diethyldiisobutoxysilane, diethyldiphenoxysilane, dibutyldiisopropyloxysilane, dibutyl-dibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyl diphenoxysilane, diallyldipropoxysilane, diphenyldiallyloxysilane, methylphenyldimethoxysilane, chlorophenyldiethyoxysilane, 1,1,1,3,3-pentamethyl-3-acetoxydisiloxane, triehoxysilane, trimethoxysilane, triethoxychlorosilane, and trimethoxy-chlorosilane.

Examples of specific silanol (III) compounds that can be used in the invention include, but are not limited to, 1,4-bis(hydroxydimethylsilyl)benzene, t-butyldimethylsilanol, triethylsilanol, trimethylsilanol, triethoxysilanol, tremethoxysilanol, triphenysilanol, diethyldihydroxysilane, methyldiphenylhydroxysilane, benzyldiphenylhydroxysilane dipropyldihydroxysilane, diallyldihydroxysilane, diphenyldihydroxysilane, butyltrihydroxysilane, phenyltrihydroxysilane, silanol terminated polydimethylsiloxanes, non-terminated polymethylhydrosiloxane, silanol terminated polydiphenylsiloxane, silanol terminated polytrifluoropropylmethylsiloxane, poly($\alpha$,$\omega$-dihydroxydimethylsiloxane, poly($\alpha$,$\omega$-dihydroxymethylphenylsiloxane, and diphenylsilanediol.

Examples of specific hydropolysiloxanes (V) that can be used in the invention include, but are not limited to, tetramethyldisiloxane, dipheyldisiloxane, trimethlcyclotrisiloxane, tetramethylcyclotetrasiloxane, polymethylhydrosiloxane, polyphenylhydrosiloxane, polyethoxyhydrosiloxane, polycyclooctylhydrosiloxane, and polychlorophenylhydrosiloxane.

According to one aspect of the present invention, a supported transition metal, such as Ti and/or V is incorporated onto a suitable composite support prepared in situ by reacting metallic magnesium with an alkyl or aromatic halide and a hydropolysiloxane (V). As used herein, supporting a material on a support (or carrier) refers to the incorporation of the material (such as silicon as an electron donor and/or titanium compounds) onto the support by physical or chemical means. Accordingly, the supported materials need not be chemically bound to the support.

Suitable support materials may be amorphous or crystalline a combination of both amorphous and crystalline regions. One embodiment of the invention utilizes a silicon-containing magnesium chloride composite support prepared in situ by reacting metallic magnesium with an alkyl or aromatic halide with a hydropolysiloxane. According to one embodiment, the support is in the form of particles having a particle size of about 10 to about 250 microns, more preferably about 10 to about 80 microns. According to one embodiment, the support material is porous and the active metal species is uniformly dispersed or supported on the support.

According to one aspect of the invention, the silicon-containing magnesium halide composite support is prepared in situ by reacting metallic magnesium with an alkyl or aromatic halide in the presence of a hydropolysiloxane (V) at a temperatures of about 75° to about 90° C. The reaction temperature may be controlled by the addition rate of alkyl or aromatic halide, the ratio of the alkyl or aromatic halide to metallic magnesium, and the ratio of the hydropolysiloxane (V) to metallic magnesium. According to one embodiment, the ratio of the alkyl or aromatic halide to metallic magnesium is preferably about 1.0 to about 3.5, and more preferably about 1.2 to about 2.0. According to one embodiment, the ratio of the hydropolysiloxane (V) to metallic magnesium is preferably about 0.01 to about 1.5, and more preferably about 0.05 to about 0.5.

Any form of magnesium may be used as the metallic magnesium source. One embodiment preferably utilizes finely divided metallic magnesium, for example, magnesium powder. To obtain a fast reaction it may be preferable to heat the magnesium under nitrogen prior to use. Examples of suitable alkyl or aromatic halides have the formula RX, where R is an alkyl group typically containing 3 to 20 carbon atoms or an aromatic group typically containing 6 to 18 carbon atoms and X is halogen, typically chlorine or bromine. Examples of specific suitable alkyl and aromatic halides include n-propyl chloride, propyl bromide, iso-propyl chloride, iso-propyl bromide, n-butyl chloride, n-butyl bromide, sec-butyl chloride, sec-butyl bromide, tert-butyl chloride, tert-butyl bromide, iso-amyl chloride, iso-amyl bromide, n-hexyl chloride, n-hexyl bromide, n-octyl chloride, n-octyl chloride, 2-ethylhexyl chloride, 2-ethylhexyl chloride, chlorobenzene, bromobenzene and iodobenzene.

Examples of suitable solvents include aliphatic hydrocarbons, aromatic hydrocarbons, alicyclic hydrocarbons, and ether compounds. Particular examples of suitable solvents include hexane, heptane, octane, decane, toluene, xylene, cyclohexane, methylcyclohexane, decalin, diethyl ether, diisopropyl ether, di-n-butyl ether, di-iso-butyl ether, diisoamyl ether, diallyl ether, tetrahydrofuran (THF), and anisole. According to one embodiment dibutyl ether, diisoamyl ether, hexane, heptane, toluene, and xylene may be used either alone or as mixed solvents, depending on the specific reaction.

According to one embodiment, transition metal compounds with OR group are those represented by the general formula of $M(OR^5)_aX_{4-a}$ (IV), wherein transition metal M is Ti or V. Of these, Ti compounds (e.g., $Ti(OR^5)_aX_{4-a}$) are typical. $R^5$ is a hydrocarbon group having 1 to 20 carbon atoms, X is halogen, and $0<a\leqq 4$. Typical $R^5$ groups include alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; alkenyl groups such as an allyl group; and aralkyl groups such as a benzyl group. Among these, alkyl groups having 2 to 18 carbon atoms and aryl groups having 6 to 18 carbon atoms are typical, and straight-chain alkyl groups having 2 to 18 carbon atoms are typical. When "a" in the above formula is a number satisfying $1\leqq a\leqq 4$, a titanium compound may be one having two or more (OR) groups different from one another.

X in the formula ($Ti(OR^5)_aX_{4-a}$), is typically chlorine, bromine or iodine, with chlorine being typical. The titanium compound represented by the formula ($Ti(OR^5)_aX_{4-a}$) is prepared in situ by reacting $Ti(OR^5)_4$ or $Ti(OR^5)_3X$ with a halogenized metal compound or by reacting a corresponding alcohol $R^5OH$ with a halogenized transition metal compound. According to one embodiment, the halogenized transition metal compound has the formula $MX_4$, where M is Ti or V and X is halogen. Other suitable halogenized metal compounds are described below. Particular examples of titanium compounds of the formula $Ti(OR^5)_4$ or ($Ti(OR^5)_3X$) include, but are not limited to, trimethoxymonochlorotitanium, triethoxyfluorotitanium, triethoxychlorotitanium, tetraethoxytitanium, tripropoxy-fluorotitanium, tripropoxychlorotitanium, tetra-n-propoxytitanium, tetraisopropoxytitanium, tributoxyfluorotitanium, tributoxychlorotitanium, triisobutoxychlorotitanium, tetra-n-butoxytitanium, tetraisobutoxytitanium, tetra-sec-butoxytitanium, tetra-tert-butoxytitanium, dipentoxydichlorotitanium, tripentoxymonochlorotitanium, tetra-n-pentyloxytitanium, tetracyclopentyloxytitanium, trioctyloxy-monochlorotitanium, tetra-n-hexyloxytitanium, tetracyclohexyloxytitanium, tetra-n-heptyloxytitanium, tetra-n-octyloxy-titanium, tetra-2-ethylhexyloxytitanium, tri-2-ethylhexyloxymonochlorotitanium, tetranonyloxytitanium, tetradecyloxytitanium, tetraisobornyloxy-titanium, tetraoleyloxytitanium, tetraallyloxytitanium, tetrabenzyloxytitanium, tetrabenzhydryloxytitanium, triphenoxychlorotitanium, tri-o-xylenoxychlorotitanium, tetraphenoxytitanium, tetra-o-methylphenoxytitanium, tetra-m-methylphenoxytitanium tetra-1-naphthyloxytitanium and tetra-2-naphthyloxytitanium and mixtures thereof.

According to one embodiment, the halogenized transition metal compound has the formula $MX_4$, where M is Ti or V and X is halogen. Particular examples of halogenized transition metal compounds include $TiCl_4$, $TiCl_4.2THF$, $TiCl_3.3THF$, $3TiCl_3.AlCl_3$, and $VCl_5$. Of these, $TiCl_4$, $TiCl_4.2THF$, $TiCl_3.3THF$, and $3TiCl_3.AlCl_3$ are particularly preferable. According to one embodiment, the ratio of $M(OR_5)_4$ or $M(OR^5)_3X$ to the halogenized transition metal compound may be about 0.5 and about 3.0, more preferably, the ratio about 0.8 to about 1.2.

The supported catalyst precursor formed as described above may be activated with a suitable co-catalyst. Suitable co-catalysts include organometallic compounds, for example, trialkylaluminum compounds such as trimethylaluminum, triethylaluminum, tri(n-propyl)aluminum, tri(isopropyl)aluminum, tri(n-butyl)aluminum, tri(isobutyl)aluminum, tri(t-butyl)aluminum, trihexylaluminum, triamylaluminum, and tri(n-octyl)aluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichlorides, ethylaluminum dichloride, isobutylaluminum dichloride, t-butylaluminum dichloride and amylaluminum dichloride; dialkylaluminum alkoxides such as diethylaluminum ethoxide; and alkylalumoxanes such as tetraethyldialumoxane, tetrabutyldialumoxane, methylalumoxane and ethylalumoxane. Among these, trialkylaluminum, the mixture of the trialkylaluminum and the dialkylaluminum halide, and the alkylalumoxane are particularly typical, with trimethylaluminum, triethylaluminum, tri-iso-propylaluminum, and tri(n-octyl)aluminum being examples of particularly preferable activators. The catalyst precursor may be activated in situ by adding the activator and catalyst precursor separately to the polymerization medium. The catalyst precursor and activator may also be combined before introduction into the polymerization medium, for example, up to about 2 hours at a temperature from about 20° C. to about 85° C.

Catalysts prepared according to aspects of the present invention may be used to polymerize alpha-olefins by any suitable process. Such processes include polymerizations carried out in suspension, in solution, or in the gas phase. Gas phase polymerizations are particularly typical, especially those taking place in stirred bed reactors and especially fluidized bed reactors.

Hydrogen may be used to control the molecular weight of the polymer. With the catalysts produced according to the present invention, molecular weight may be suitably controlled with hydrogen when the polymerization is carried out at relatively low temperatures, e.g., from about 30° C. to about 105° C.

The catalysts prepared according to the invention are particularly useful for the production of LLDPE resins. Such LLDPE resins may have a density of 0.94 g/cc or less, preferably 0.930 or less or even 0.910 g/cc or less. In accordance with certain aspects of the present invention, it is possible to achieve densities of less than 0.910 g/cc and even 0.880 g/cc.

U.S. Pat. No. 4,076,698, by Anderson et al., describes dvantageous properties of LLDPE resins. LLDPE resins may be copolymers of ethylene with one or more $C_3$-$C_{10}$ alpha-olefins. Thus, copolymers having two types of monomeric units are possible as well as terpolymers having three types of monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. Particularly preferred co-monomers are 1-hexene and 1-butene for the catalyst prepared according to the present invention.

The relatively low MFR values of the copolymers prepared with the catalysts of this invention indicate that they are suitable for the preparation of various rotational molding products and film products because such films are likely to have excellent strength properties. LLDPE resins produced in accordance with the present invention preferably contain at least about 80 percent by weight of ethylene units. Most preferably, the LLDPE resins of the invention contain at least 2 weight percent, for example from 2 to 20 weight percent of an alpha-olefin.

In the present invention, the solid catalyst component may be subjected to pre-polymerization, thereby obtaining a pre-polymerized catalyst component, which is then used for the gas phase polymerization. In carrying out the pre-polymerization, for example, the solid catalyst component and an organoaluminum compound are contacted with an olefin. Examples of the olefin used for the pre-polymerization are ethylene, propylene and butene-1. The pre-polymerization may be either homopolymerization or copolymerization. In the pre-polymerization, it may be preferable to make a slurry containing the solid catalyst component using a solvent. Examples of suitable solvents include aliphatic hydrocarbons such as butane, pentane, hexane and heptane, and aromatic hydrocarbons such as toluene and xylene. The slurry concentration may typically be from about 0.001 to 0.3 g-solid catalyst component/10 ml solvents, and more typically from about 0.02 to about 0.2 g-solid catalyst component/10 ml-solvent. The organoaluminum compound may be used in an amount typically from about 0.1 to about 100, more typically from about 0.5 to about 50, calculated as the Al/Ti atomic ratio, i.e., the atomic ratio of the Al atom in the organoaluminum compound to the Ti atom in the solid catalyst component. The temperature for the pre-polymerization is typically about −30° to about 100° C., and more typically about −10° to 85° C. Yield of the pre-polymer is typically about 0.1 to 500 g, and more typically about 0.5 to about 50 g per mmol of Ti. When used for the gas phase polymerization, the pre-polymerized solid catalyst component obtained may be combined with an inert diluent to form slurry, or dried to obtain a flowing powder.

There are no particular restrictions on the polymerization conditions for production of polyolefins by the method of the invention, such as the polymerization temperature, polymerization time, polymerization pressure, monomer concentration, etc., but typically the polymerization temperature is about −100° to about 300° C., the polymerization time is about 10 seconds to about 20 hours and the polymerization pressure is typically from normal pressure to about 3500 $kg/cm^2$. Hydrogen or the like may be used to adjust the molecular weight during polymerization. The polymerization may be carried out in a batch system, semi-continuous system or continuous system, and it may be carried out in 2 or more stages under different polymerization conditions. The polyolefin may be directly obtained from gas phase process, or obtained by isolation and recovery of solvent from the slurry process, according to conventionally known methods.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, will appreciate that many changes can be made in the specific embodiments which are disclosed and still obtain a like or similar result without departing from the scope of the invention.

EXAMPLES

The solid catalyst composition and properties of polymers in the examples were measured according to the following methods:

(1) Ti, Si, and Mg content in the solid catalyst component were determined by ICP emission analysis method.

(2) Melt flow index (MI) of polymer was measured at 190° C., according to ASTM D1238. Melt flow ratio (MFR), which is the ratio of high melt flow index (HLMI or $I_{21}$) to melt index ($I_2$), was used as a measure of melt fluidity and a measure of the molecular weight distribution of polymer. The melt flow ratio is believed to be an indication of the molecular weight distribution of the polymer, the higher the value, the broader the molecular weight distribution.

(3) Density was measured according to ASTM D 1505-98. Molecular weights and molecular weight distributions of polymers were also determined by gel permeation chromatography (GPC) versus a polyethylene standard. DSC was used to measure the melting point and ΔH of polymers.

(4) Lower molecular weight components were evaluated by the content of hexane-soluble portion (CHS) via Soxlet extraction, which was carried out by reflux for 8 hours.

Example 1

Slurry Polymerization

Synthesis of solid catalyst component. Anhydrous hexane (2 L), magnesium (31.9 g), iodine (3.3 g), isopropanol (3.66 ml), butyl chloride (2.8 ml) was successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (18 ml, 80.7 mmol) and silicon tetrachloride (19 ml, 165.85 mmol) were added to the reactor and held for reaction at 80° C. for 40 minutes. After 40 minutes, $Ti(OiPr)_4$ (45.5 ml, 165.4 mmol) with $TiCl_4$ (18.3 ml, 166.0 mmol) was charged, and the reaction was initiated at 80° C. for 40 minutes. After 40 minutes, n-chlorobutane (213.3 ml, 2041.5 mmol) and polymethylhydrosiloxane (36 ml) were dropwise added to the reaction mixture for 4 hours at 80° C. The dark slurry mixture formed in the process was stirred for another 4 hours at 80° C. Then the reaction was stopped, and the solution was allowed to settle for 30 minutes. After decanting the solvent, the solid was washed with 2 L of hexane for 3 times. A dark-brown catalyst component was obtained after dried under vacuum. Mg, Ti, Si content in the solid catalyst is 14.5, 7.5, and 1.5 wt %, respectively.

Ethylene Polymerization. Slurry polymerization was carried out in a 2 L stainless autoclave equipped with a magnetic stirrer at 85° C. and under 145 psi pressure. After purging the reactor with nitrogen at 60° C., 1000 ml of hexane was charged to reactor. After the temperature was raised to 65° C., 1.0 ml of 1.0 M triethylaluminum, 10 mg of solid catalyst component was successively introduced into the reactor. Once the temperature was raised to 85° C., 16 psi of hydrogen was charged to reach to 45 psi (29 psi of nitrogen) pressure in the reactor, and ethylene was allowed to feed into the reactor to maintain 90 psi, and polymerization was carried out for 1 hour at 85° C. The reaction was terminated by stopping the ethylene feed and venting the reactor, and the reactor was allowed to cool to room temperature. The polyethylene was collected and dried under vacuum at 70° C. for 4 hours. 78 g of polyethylene was obtained. The catalyst productivity was 5474 g polymer/g catalyst-h-100 psi ethylene, indicating very high catalyst activity. The bulky density of polymer was 0.401 g/cm$^3$. The melt index of the polyethylene was 0.980 g/10 minutes, measured at 190° C. under a weight of 2.16 kg (ASTM D 1238 Condition E), and the melt flow ratio (MFR) was 27.58. The molecular weight distribution ($M_w/M_n$), measured by GPC, was 3.7.

Ethylene/1-Hexene Copolymerization. A 2.0-liter stainless steel autoclave under a slow nitrogen purge at 65° C. was filled with dry hexane (1000 ml). 1.0 ml of 1.0 M triethylaluminum and 50 mg of solid catalyst component was successively introduced into the reactor at 65° C. The reactor was closed, the stirring was increased to 750 rpm, and the internal temperature was raised to 85° C. The internal pressure was increased to 38 psig with hydrogen (29 psi of nitrogen). 120 ml of 1-hexenes and ethylene were introduced to maintain the total pressure at about 90 psig. The co-polymerization was carried out immediately and continued at 85° C. for 30 minutes, and then the ethylene supply was stopped and reactor was allowed to cool. The copolymer was collected and dried under vacuum at 70° C. for 5 hours. 85 g of copolymer having good powder property was obtained with a density of 0.9168 g/cm$^3$, a melting point of 124.8° C. and ΔH=106.1 J/g. The productivity of the catalyst was 5965 g polymer/g catalyst-h-100 psi ethylene, indicating very high catalyst activity. Sticky/rubbery chunk formation and reactor fouling do not occur. The melt index of the polyethylene was 1.194 g/10 minutes, measured at 190° C. under a weight of 2.16 kg (ASTM D 1238 Condition E), and the melt flow ration (MFR) was 29.42. The molecular weight distribution ($M_w/M_n$), measured by GPC, was 3.8. The content of n-hexane-soluble portion was 12.51 wt %.

Example 2

Slurry Polymerization

Synthesis of solid catalyst component. Anhydrous hexane (2 L), magnesium (31.9 g), iodine (3.3 g), isopropanol (3.66 ml), butyl chloride (2.8 ml) was successively charged into a 5 L reactor equipped with an anchor stirrer driven by a magnetic motor. The reactor was heated to 85° C. within 60 minutes, and then cooled to 80° C. within 20 minutes. Tetraethoxy orthosilicate (18 ml, 80.7 mmol) and silicon tetrachloride (19 ml, 165.85 mmol) were added to the reactor and held for reaction at 80° C. for 40 minutes. After 40 minutes, diethyldihydroxysilane ($Et_2Si(OH)_2$) (9.684 g, 80 mmol) was added. Then, $Ti(OiPr)_4$ (45.5 ml, 165.4 mmol) with $TiCl_4$ (18.3 ml, 166.0 mmol) was charged, and the reaction was initiated at 80° C. for 40 minutes. After 40 minutes, n-chlorobutane (213.3 ml, 2041.5 mmol) and polymethylhydrosiloxane (36 ml) were dropwise added to the reaction mixture for 4 hours at 80° C. The dark slurry mixture formed in the process was stirred for another 4 hours at 80° C. Then the reaction was stopped, and the solution was allowed to settle for 30 minutes. A dark-brown catalyst component was obtained by decanting the solvent, washed with 2 L of hexane for 3 times, and dried under vacuum. The Mg, Ti, Si content in the solid catalyst is 14.6, 7.2, and 2.0 wt %, respectively.

Ethylene/1-Hexene Copolymerization. A 2.0-liter stainless steel autoclave under a slow nitrogen purge at 65° C. was filled with dry hexane (1000 ml). 1.0 ml of 1.0 M triethylaluminum and 50 mg of solid catalyst component (precursor) was successively introduced into the reactor at 65° C. The reactor was closed, the stirring was increased to 750 rpm, and the internal temperature was raised to 85° C. The internal pressure was increased to 38 psig with hydrogen (29 psi of nitrogen). 120 ml of 1-hexenes and ethylene were introduced to maintain the total pressure at about 90 psig. The co-polymerization was carried out immediately, and continued at 85° C. for 30 minutes, and then the ethylene supply was stopped and reactor was allowed to cool. The copolymer was collected and dried under vacuum at 70° C. for 5 hours. 95 g of copolymer having good powder property (good morphology, no sticky, and no reactor fouling) was obtained with the density of 0.9169 g/cm$^3$, the melting point of 124.9° C. and ΔH=105.1 J/g. The productivity of the catalyst was 6667 g polymer/g catalyst-h-100 psi ethylene. The melt index of the polyethylene was 1.095 g/10 minutes, measured at 190° C. under a weight of 2.16 kg (ASTM D 1238 Condition E), and the melt flow ration (MFR) was 27.52. The molecular weight distribution ($M_w/M_n$), measured by GPC, was 3.6. The content of n-hexane-soluble portion was 10.51 wt %.

Comparative Example 1

A solid catalyst component (or precursor) was prepared in the same manner as in Example 1 except that the silicon tetrachloride, tetraethoxy orthosilicate, and polymethylhydrosiloxane were not used. The catalyst was prepared in accordance with the teaching of the Durand et al French Patent No. 2,099,311 and No. 2,116698, and of Eric Daire et al European Patent EP 0,529,977. Co-polymerization was carried out in the same manner as in Example 1 at the same polymerization conditions. 52.8 g of copolymer was obtained with the density of 0.9168 g/cm$^3$, the melting point of 125.16° C. The copolymer showed poor powder flow ability, and sticky/rubbery chunk and reactor fouling occurred. The productivity of the catalyst was 3984 g polymer/g catalyst-h-100 psi ethylene. The melt index of the polyethylene was 1.282 g/10 minutes, measured at 190° C. under a weight of 2.16 kg (ASTM D 1238 Condition E), and the melt flow ratio (MFR) was 34.5. The molecular weight distribution ($M_w/M_n$), measured by GPC was 4.8. The content of boiling n-hexane-soluble portion was 18.51%. As compared with the inventive catalysts, the catalyst without any modifiers shows lower catalyst productivity, broader molecular weight distribution, and higher content of low molecular weight fraction, very sticky polymer and serious reactor fouling.

Comparative Example 2

A solid catalyst component (or precursor) was prepared in the same manner as in Example 1 except that the both silicon tetrachloride and polymethylhydrosiloxane were not used. Co-polymerization was carried out in the same manner as in Example 1 at the same polymerization conditions. 13.2 g of copolymer was obtained with a density of 0.9245 g/cm$^3$ and a melting point of 126.5° C. The productivity of the catalyst was 996 g polymer/g catalyst-h-100 psi ethylene. The melt index of the polyethylene was 0.482 g/10 minutes, measured at 190° C. under a weight of 2.16 kg (ASTM D 1238 Condition E), and the melt flow ratio (MFR) was 28.2. This result indicates that catalyst modified with tetraethoxy orthosilicate shows the lowest catalyst productivity, poor H2 response and comonomer incorporation, compared with the results from examples 1-3.

Comparative Example 3

A solid catalyst component (or precursor) was prepared in the same manner as in Example 1 except that the polymethylhydrosiloxane was not used. Co-polymerization was carried out in the same manner as in Example 1 at the same polymerization conditions. 61.7 g of copolymer was obtained with a density of 0.9251 g/cm$^3$ and a melting point of 126.8° C. The productivity of the catalyst was 4656 g polymer/g catalyst-h-100 psi ethylene. The melt index of the polyethylene was 0.604 g/10 minutes, measured at 190° C. under a weight of 2.16 kg (ASTM D 1238 Condition E), and the melt flow ratio (MFR) was 28.5. The catalyst shows lower catalyst productivity, poor H2 response and comonomer response.

Comparative Example 4

A solid catalyst component (or precursor) was prepared in the same manner as in Example 1 except that tetraethoxy orthosilicate/silicon tetrachloride mixture was not used. The Mg, Ti, and Si contents in the solid catalyst are 14.5, 7.5, and 0.85 wt %, respectively. Co-polymerization was carried out in the same manner as in Example 1. 15 g of copolymer was obtained with a density of 0.9300 g/cm$^3$ and a melting point of 128.8° C. The productivity of the catalyst was 1132 g polymer/g catalyst-h-100 psi ethylene. The melt index of the polyethylene was 0.204 g/10 minutes, measured at 190° C. under a weight of 2.16 kg (ASTM D 1238 Condition E), and the melt flow ration MFR) was 26.5. The molecular weight distribution ($M_w/M_n$), measured by GPC was 3.4. These results show that polymethylhydrosiloxane alone modified catalyst has lower catalyst productivity and polymer bulk density, and poor H2 response and comonomer incorporation.

Example 3

Gas Phase Polymerization

Catalyst was prepared as described in Example 1. Prepolymerization was performed as follows: 2 liters of n-hexane, 48 millimoles of tri-n-octylaluminium and a quantity of previously prepared catalyst containing 14.6 millimoles of titanium were introduced into a 5 liter stainless steel reactor maintained under nitrogen atmosphere, provided with a stirring device rotating at 750 revolutions per minute and heated to 68° C. Hydrogen was then introduced to obtain a partial pressure of 0.5 bar, and ethylene was introduced at a steady flow rate of 160 g/h for 3 hours. At the end of this time the reactor was degassed and its content was transferred into a flask evaporator in which the n-hexane was removed under vacuum followed by nitrogen heated to 40-50° C. 480 g of prepolymer containing 43.28 g polyethylene per millimole of titanium were obtained.

Gas Phase Ethylene/1-Hexene Copolymerization. Co-polymerization was carried out in a 10 liter autoclave designed for gas phase fluidized polymerization, equipped with an anchor stirrer with magnetic stirrer drive above top of autoclave and a valve at the base of the autoclave to withdraw polymer. The temperature was regulated using steam/water via the outer jacket of autoclave. A fluidized seed particle of polymer (200 g) and a quantity of previously prepared prepolymer (30-50 g) with Al/Ti of 2.51 were introduced into the 10 liter gas phase polymerization reactor maintained under nitrogen atmosphere, provided with a stirring device rotating at 150 revolutions per minute and heated to 68° C. Nitrogen (3.9 bar, 38%), and hydrogen (1.1 bar, 12%) were charged into the reactor to provide total pressure of 5 bars. After the reactor temperature was raised to 85° C., ethylene was charged into the reactor to obtain total pressure of 10 bar, together with 1-hexene ($C_6$) at $C_6/C_2$ ratio of 0.0949. The feed of $C_6/C_2$ was continued at a $C_6/C_2$ ratio of 0.0949 until 1000 grams of ethylene was consumed during the gas phase polymerization. Then the reactor was cooled down and degassed and an ethylene/1-hexene polymer free from agglomerate was drawn off, which had a density of 0.9158, a melt index $MI_{2.16}$ of 2.433 g/10 minutes. The polymer had good flowability and improved morphology without stickiness and fouling. The catalyst activity was 1507 g of polymer per millimole of titanium per hour of reaction and per 100 psi ethylene (g/mM/h/100 psi). The melt flow ratio (MFR) of polymer was 29.5. The molecular weight distribution ($M_w/M_n$), measured by GPC, was 3.8. The content of boiling n-hexane-soluble portion was 11.71 wt %.

Comparative Example 6

Catalyst was prepared a described in Comparative Example 1. Pre-polymerization was carried out exactly as in Example 3. 480 g of M10 prepolymer containing 40.79 g polyethylene per millimole of titanium were obtained.

Gas Phase Copolymerization of Ethylene/1-Hexene. The polymerization was carried out exactly as Example 3. Under these conditions, $C_6/C_2$ was continued to feed into reactor at a $C_6/C_2$ ratio of 0.0949 until 1000 grams of ethylene was consumed during the gas phase polymerization. Then the reactor was cooled down and degassed, and an ethylene/1-hexene copolymer was slowly drawn off, which had a density of 0.9170, a melt index $MI_{2.16}$ of 2.334 g/10 minutes. The polymer had worse flowability and morphology due to chunk formation, sticky powder, and reactor fouling. The catalyst activity was 846 g of polymer per millimole of titanium per hour of reaction and per 100 psi ethylene (g/mM/h/100 psi). The melt flow ratio (MFR) of polymer was 32.03. The $M_w/M_n$ ratio of polyethylene, measured by GPC was 4.3.

These examples demonstrate that the catalyst of the present invention surpases the prior art catalysts both in slurry polymerization and in gas phase polymerization. The catalyst of the present invention shows a high activity and yields LLDPE product having a relatively narrow molecular weight distribution and relatively reduced low molecular weight fraction, good H2 and comonomer/density response.

Table 1 tabulates hydrogen/ethylene ratios and 1-hexene/ethylene ratios in the gas phase employed in the polymerization reactions, catalyst productivity, polymer melt flow indexes ($I_{21}$), polymer density, resin melting point, and the reactor performance/polymer for additional trials described as follows: The catalysts used in the Examples 4-14 (Table) were prepared as described in Example 1. The catalysts in Comparative Examples 7-12 were prepared as described in Comparative Example 1. The catalyst in Comparative Example 13 was prepared as described in Comparative Example 2. The catalysts in Comparative Examples 14-20 were prepared as described in Comparative Example 3. The catalyst in Comparative Example 21-22 was prepared as described in Comparative Example 4.

The catalysts of the present invention showed high catalyst productivity and good comonomer/density response and hydrogen response as well as relatively narrow molecular weight distribution. Another important property of the inventive catalysts is that LLDPE resins produced with the inventive catalysts showed excellent flow ability without any reactor fouling and chunk formation, even if the polymer density is less than 0.910 at high production rate in the gas phase polymerization. Comparative example of catalyst without any silane reagent and catalysts prepared in accordance with the teaching of the French Patent No. 2,116698 (Durand et al.) and European Patent EP 0,529,977 (Daire et al.) had lower catalyst activity and relatively broader molecular weight distribution as well as worse flow ability of polymer and chunk formation with low density of less than 0.9175 at high catalyst productivity. Even if the density of LLDPE is less than 0.918 in the gas phase polymerization, sticky/rubbery and chunky resins were formed at high production rate or even normal production rate using the prior art catalysts. At high production rate the reaction was often terminated at the low density of less than 0.9175 due to big sticky/rubbery chunk formation and serious reactor fouling. On the other hand, the catalysts prepared by using $Si(OEt)_4$, or $Si(OEt)_4/SiCl_4$, or PMHS, respectively, had lower catalyst productivity, and such poor hydrogen response and poor comonomer/density response that the target products could not be produced.

TABLE 1

| Examples | H2/C2 ratio | C6/C2 ratio | Prod.[1] | $MI_{2.16}$ (g/10 mins) | Density (g/ml) | Melting point (° C.) | Polymer Morphology |
|---|---|---|---|---|---|---|---|
| 4 | 0.20 | 0.0904 | 1254 | 1.857 | 0.9164 | 124.9 | Excellent flow ability |
| 5 | 0.40 | 0.0904 | 1425 | 7.255 | 0.9212 | 126.0 | Excellent flow ability |
| 6 | 0.23 | 0.0994 | 1277 | 2.433 | 0.9158 | 124.5 | Excellent flow ability |
| 7 | 0.27 | 0.1085 | 1083 | 2.284 | 0.9159 | 124.5 | Excellent flow ability |
| 8 | 0.20 | 0.1130 | 860 | 2.174 | 0.9130 | 123.7 | Excellent flow ability |
| 9 | 0.24 | 0.1130 | 1005 | 2.666 | 0.9139 | 124.7 | Excellent flow ability |
| 10 | 0.16 | 0.1130 | 886 | 0.744 | 0.9115 | 123.9 | Excellent flow ability |
| 11 | 0.16 | 0.1243 | 1043 | 1.198 | 0.9112 | | Excellent flow ability |
| 12 | 0.16 | 0.1356 | 963 | 0.737 | 0.9088 | 124.6 | Excellent flow ability |
| 13 | 0.20 | 0.1356 | 952 | 2.027 | 0.9093 | 123.9 | Excellent flow ability |
| 14 | 0.20 | 0.1469 | 1053 | 2.800 | 0.9008 | 123.9 | Excellent flow ability |
| Comp. 7 | 0.24 | 0.0904 | 630 | 2.644 | 0.9187 | 125.9 | Small chunk formation |
| Comp. 8 | 0.40 | 0.0904 | 952 | 6.585 | 0.9202 | 127.1 | Good flow ability |
| Comp. 9 | 0.20 | 0.0904 | 785 | 1.915 | 0.9173 | 125.2 | Chunk formation |
| Comp. 10 | 0.22 | 0.0994 | 1013 | 2.334 | 0.9173 | 124.9 | Chunk formation |
| Comp. 11 | 0.20 | 0.1085 | 757 | 1.715 | 0.9178 | 125.1 | Chunk, and Reactor fouling |
| Comp. 12 | 0.20 | 0.1130 | 450[2] | 2.556 | 0.9168 | 124.8 | Sticky inside the reactor wall, big chunk formation |
| Comp. 13 | 0.20 | 0.0904 | Very low activity | 0.650 | 0.9300 | | Excellent flow ability |
| Comp. 14 | 0.20 | 0.0904 | 453 | 1.006 | 0.9184 | 124.9 | Excellent flow ability |
| Comp. 15 | 0.20 | 0.0904 | 309 | 0.911 | 0.9182 | 125.2 | Excellent flow ability |
| Comp. 16 | 0.40 | 0.0904 | 450 | 4.427 | 0.9206 | 126.5 | Excellent flow ability |
| Comp. 17 | 0.20 | 0.1130 | 586 | 0.701 | 0.9188 | 125.2 | Excellent flow ability |
| Comp. 18 | 0.31 | 0.1130 | 419 | 1.980 | 0.9183 | 125.7 | Excellent flow ability |
| Comp. 19 | 0.30 | 0.1356 | 467 | 2.108 | 0.9202 | 127.5 | Excellent flow ability |
| Comp. 20 | 0.20 | 0.1356 | 582 | 1.000 | 0.9146 | | Excellent flow ability |
| Comp. 21 | 0.20 | 0.0904 | Very | 0.467 | 0.9355 | | |

TABLE 1-continued

| Examples | H2/C2 ratio | C6/C2 ratio | Prod.[1] | $MI_{2\ 16}$ (g/10 mins) | Density (g/ml) | Melting point (° C.) | Polymer Morphology |
|---|---|---|---|---|---|---|---|
| | | | low activity | | | | |
| Comp. 22 | 0.20 | 0.1469 | Very low activity | 0.892 | 0.9300 | | |

[1]Catalyst Productivity, in g Polymer/mmoleTi/h/100 psi $C_2$
[2]Reaction terminated due to reactor fouling
* Polymerization conditions see Example 3.

What is claimed is:

1. A catalyst component useful for the co-polymerization of ethylene and an alpha-olefin, wherein the catalyst component is prepared by:

(i) contacting a halogen-substituted silane with an one or more compounds selected from the group of compounds consisting of alkoxysilanes, silanols, and hydropolysiloxanes; wherein the halogen-substituted silane has formula (I) $R^1_xSiX_y$, wherein $R^1$ is $C_1$-$C_{20}$ hydrocarbon, X is halogen, x=0-3, and y=1-4; wherein the alkoxysilane has formula (II) $R^2_mSi(OR^3)_n$, wherein $R^2$ and $R^3$ are $C_1$-$C_{20}$ hydrocarbon, m=0-3, and n=1-4; where the silanol has formula (III) $R^4_wSi(OH)_{4-w}$, wherein $R^4$ is $C_1$-$C_{18}$ hydrocarbon and w is 1, 2 or 3; and wherein the hydropolysiloxane has repeat units of formula (V) $R^6_pH_qSiO_{((4-p-q)/2)}$, wherein $R^6$ is alkyl, aryl, aralkyl, alkoxy or aryloxy, p is 0, 1 or 2; q is 1, 2 or 3; and $p+q\leqq3$;

(ii) treating the mixture of (i) with a transition metal compound having formula (IV) $M(OR^5)_aX_{4-a}$, wherein M is titanium or vanadium; $R^5$ is $C_1$-$C_{20}$ hydrocarbon, X is halogen, and $0<a\leqq4$; and (iii) contacting the mixture of (ii) with a support prepared by reacting metallic magnesium with an alkyl halide or an aromatic halide and with a one or more compounds selected from the group consisting of silanols of formula (III) and hydropolysiloxanes of formula (V).

2. The catalyst component of claim 1, wherein the transition metal of formula (IV) is prepared by reacting a halogenized transition metal compound with a compound having the formula $M(OR^5)_4$ or the formula $M(OR^5)_3X$, wherein M, $R^5$, and X are as previously defined.

3. The catalyst component of claim 1, wherein the transition metal of formula (IV) is prepared by reacting an alcohol of the formula $R^5OH$ with a compound of the formula $MX_4$, wherein M, $R^5$, and X are as previously defined.

4. The catalyst component of claim 1, having a G value defined as $$G=[\text{formula (IV)}]/\{[\text{Mg}]+[\text{formula (I)}]+[\text{formula (II)}]+([\text{formula (III)}]\text{ or }[\text{formula (V)}])\}$$

wherein G has a value of about 0.05 to about 0.8.

5. The catalyst component of claim 1, having a H value defined as $$H=([\text{formula (III)}]\text{ or }[\text{formula (V)}])/([\text{formula (I)}]+[\text{formula (II)}])$$

wherein H has a value of about 0.05 to about 0.9.

6. The catalyst component of claim 1, wherein M is titanium.

7. The catalyst component of claim 1, wherein the silane of formula (I) is selected from the group consisting of silicon tetrachloride, tetrabromosilane, tetrafluorosilane, tetrachlorosilane, allyldichlorosilane, allyltrichlorosilane, benzyltrichlorosilane, bis(dichlorosilyl)methane, 2-bromoethyltrichlorosilane, t-butyldichloro-silane, t-butyltrichlorosilane, 2-(carbomethoxy)ethyltrichlorosilane, 2-chloroethylmethyl-dichlorosilane, 2-chloroethyltrichlorosilane, 1-chloroethyltrichlorosilane, chloroethylmethyl-dichlorosilane, ((chloromethyl)phenylethyl) trichlorosilane, chloroethyltrichlorosilane, 2-cyanoethylmethyldichlorosilane, cyclohexyl-trichlorosilane, cyclopentyltrichlorosilane, cyclotetramethylenedichlorosilane, cyclo-trimethylenedichlorosilane, decylmethyldichlorosilane, dibenzyloxydichlorosilane, 1,5-dichlorohexamethyltrisiloxane, (dichloromethyl) trichlorosilane, dichlorosilane, 1,3-dichlorotetramethyldisiloxane, diethoxydichlorosilane, ethylmethyldichlorosilane, ethyltrichlorosilane, heptyltrichlorosilane, hexachlorodisilane, hexachloro-disiloxane, isobutyltrichlorosilane, methyldichlorosilane, methyltriclilorosilane, octyltrichloro-silane, pentyltrichlorosilane, propyltrichlorosilane, and trichloromethyltrichlorosilane.

8. The catalyst component of claim 1, wherein the alkoxysilane of formula (II) is selected from the group consisting of tetramethoxysilane, tetraethoxysilane, tetraisopropoxysilane, tetrapropoxysilane, tetrabutoxysilane, tetraisobutoxysilane, tetraphenoxysilane, tetra(p-methylphenoxy)silane, tetrabenzyloxysilane, tetrakis(2-methoxyethoxy)silane, tetrakis(2-ethylhexoxy)silane, tetraallyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyltrimethoxysilane, octadecyltrimethoxysilane, octadecyltriethoxysilane, octyltriethoxysilane, phenyltrimethoxysilane, phenyltriethoxysilane, benzyltriphenoxysilane, methyltriallyloxysilane, dimethyldimethoxysilane, dimethyldiethoxysilane, dimethyldi:sopropyloxysilane, dimethyl-dibutoxysilane, dimethyldihexyloxysilane, dimethyldiphenoxy-silane, diethyldiethoxysilane, diethyldiisobutoxysilane, diethyldiphenoxysilane, dibutyldiisopropyloxysilane, dibutyl-dibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyl diphenoxysilane, diallyldipropoxysilane, diphenyldiallyloxysilane, methylphenyldimethoxysilane, chlorophenyldiethyoxysilane, 1,1,1,3,3-pentamethyl-3-acetoxydisiloxane, triehoxysilane, trimethoxysilane, triethoxychlorosilane, and trimethoxy-chlorosilane.

9. The catalyst component of claim 1, wherein the silanol of formula (III) is selected from the group consisting of 1,4-bis(hydroxydimethylsilyl)benzene, t-butyldimethylsilanol, triethylsilanol, trimethylsilanol, triethoxysilanol, tremethoxysilanol, triphenysilanol, diethyldihydroxysilane, methyldiphenylhydroxysilane, benzyldiphenylhydroxysilane dipropyldihydroxysilane, diallyldihydroxysilane, diphenyldihydroxysilane, butyltrihydroxysilane, phenyltrihydroxysilane, silanol terminated polydimethylsiloxanes, non-terminated polymethylhydrosiloxane, silanol terminated polydiphenylsiloxane, silanol terminated polytrifluoropropylmethylsiloxane, poly(α,ω-dihydroxydimethylsiloxane, poly(α,ω-dihydroxymethylphenylsiloxane, and diphenylsilanediol.

10. The catalyst component of claim 1, wherein the hydropolysiloxanes having repeat units of formula (V) is selected from the group consisting of tetramethyldisiloxane, dipheyldisiloxane, trimethylcyclotrisiloxane, tetramethylcyclotetrasiloxane, polymethylhydrosiloxane, polyphenylhydrosiloxane, polyethoxyhydrosiloxane, polycyclooctylhydrosiloxane, and polychlorophenylhydrosiloxane.

11. The catalyst component of claim 1, further comprising an alkyl aluminum co-catalyst.

12. The catalyst component of claim 11, wherein the alkylaluminum co-catalyst is selected from the group consisting of trimethylaluminum, triethylaluminum, tri-iso-propylaluminum, tri(n-octyl)aluminum, and the mixtures thereof.

13. The catalyst component of claim 11, wherein the molar ratio of the alkylaluminum co-catalyst to transition metal is about 0.5 to about 500.

* * * * *